Figure 1:
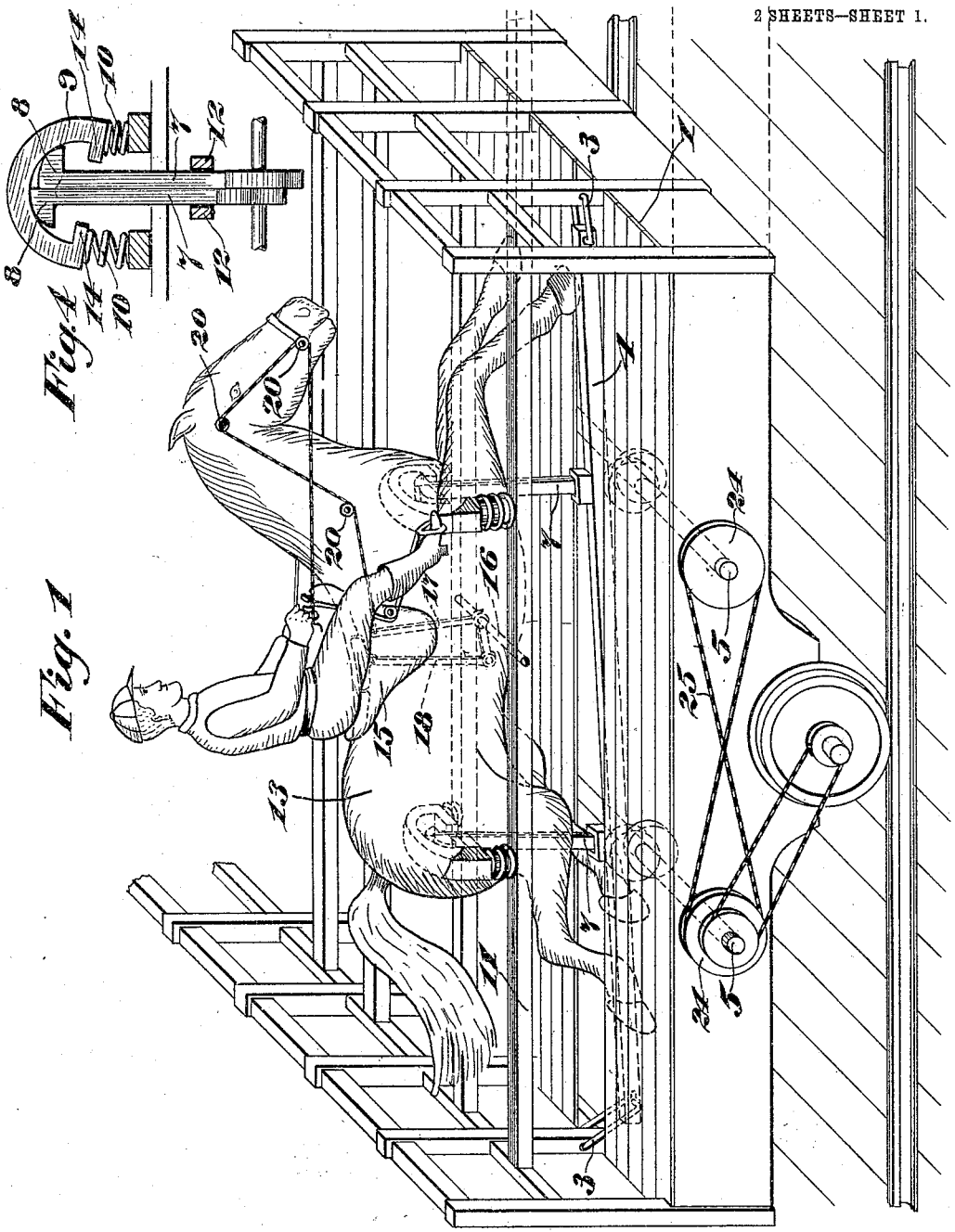

A. A. WELSH.
AMUSEMENT APPARATUS.
APPLICATION FILED AUG. 2, 1909.

956,243.

Patented Apr. 26, 1910.
2 SHEETS—SHEET 2.

Witnesses:
L. A. Gauvin
C. J. Gauvin

ANDREW ARCHIBALD WELSH
Inventor,

By Marion & Marion
Attorneys

UNITED STATES PATENT OFFICE.

ANDREW ARCHIBALD WELSH, OF GANANOQUE, ONTARIO, CANADA.

AMUSEMENT APPARATUS.

956,243.	Specification of Letters Patent.	Patented Apr. 26, 1910.

Application filed August 2, 1909. Serial No. 510,945.

*To all whom it may concern:*

Be it known that I, ANDREW ARCHIBALD WELSH, a subject of the King of Great Britain, residing at Gananoque, county of Leeds, in the Province of Ontario, Canada, have invented certain new and useful Improvements in Amusement Apparatus; and I do hereby declare that the following is a full, clear, and exact description of the invention, such as will enable others skilled in the art to which it appertains to make and use the same.

The invention to be hereinafter described relates to amusement apparatus, and more particularly to the mechanical horses used on roundabouts and like devices.

Broadly speaking, it comprises a framework, a mechanical horse mounted to have a galloping motion in the framework, and means for imparting any desired gait or motion to the horse.

In order to more clearly disclose the construction, operation and use of the invention, reference should be had to the accompanying drawings forming part of the present application.

Throughout the several figures of the drawings, like reference characters designate the same parts.

Figure 2:
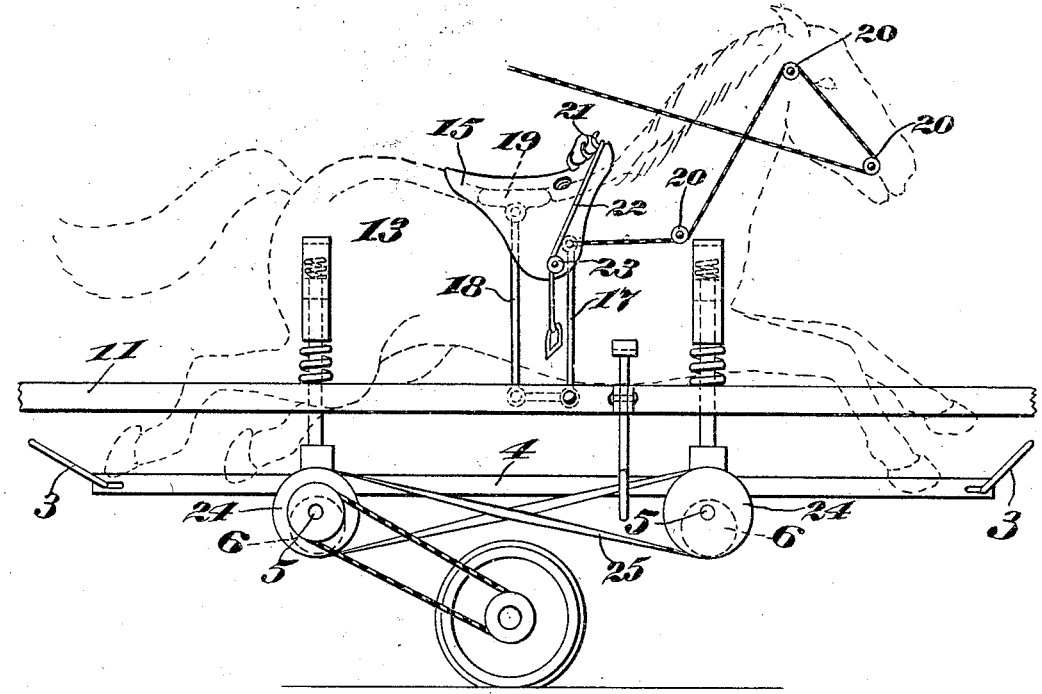
Figure 3:
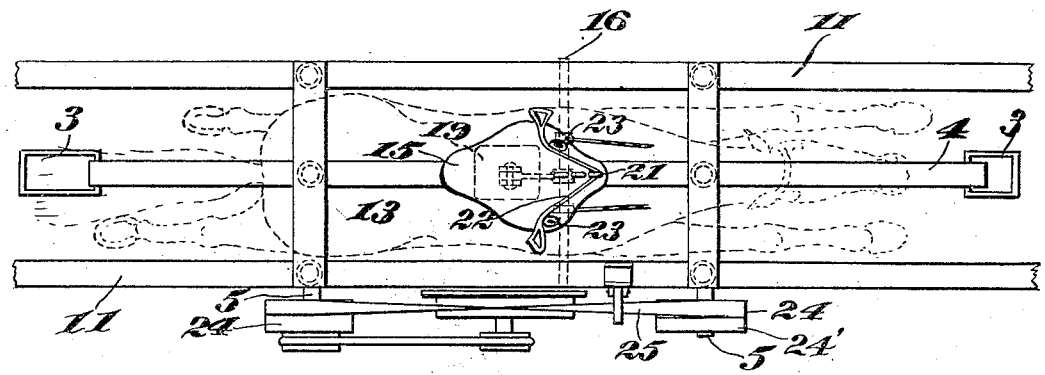

In the drawings: Figure 1 is a perspective of the invention, in use; Fig. 2 is a side elevation, with the frame omitted; Fig. 3 is a plan view of Fig. 2; and, Fig. 4 is a detail of part of the operating mechanism.

The main object of the invention is to provide a mechanical horse having operating mechanism which will give the horse, as near as possible, all of the natural motions of a horse in any desired gait.

Referring to the drawings in detail, 1 indicates a framework for supporting the mechanical horse, and the several operating parts. The frame, of course, is supported in the usual way. Within the frame is swingingly suspended, by links 3, a rod 4, which rests upon shafts 5, provided with eccentrics 6. The rod 4 is provided with posts, each comprising two duplicate sections 7, provided with heads 8 adapted to fit into the concave portions of yieldably supported yokes 9, mounted on springs 10, seated on longitudinal bars 11. The two sections 7 of each post are held in parallel relation by the collar 12, and each is separately operated by an eccentric 6 on the shaft 5. The eccentrics are arranged in pairs, and those of each pair are so disposed that the two sections 7 of each post will not be moved to the same height at the same time, thus causing the yokes 9 to tilt toward one side, as shown in Fig. 4. The yokes 9, of course, support the body of a mechanical horse 13. The pairs of eccentrics, on the parallel shafts 5, are so disposed, of course, as to cause a horse to rock, the rocking and tilting movement combining to reproduce a close imitation of the natural motion of a horse in any desired gait.

In order to prevent possible disengagement of the parts, the yokes are provided with inwardly projecting shoulders 14, adapted to engage the under face of the heads 8 and so limit downward movement of the same.

The springs 10, supporting the yokes 9, are of such strength as to raise the yokes to a considerable height when no rider or weight is on the horse 13. Of course, as the yokes move upward, the shoulders 14 carry the post sections 7 with them, and so raise their lower ends above the path of travel of the operating eccentrics 6, rendering the whole mechanism inoperative. Even when there is a rider on the horse, it may be desired to stop the motion. To this end, a particular mechanism has been provided, comprising a movably mounted saddle 15, a rod 16 journaled in the fixed bars 11, a bell crank 17 journaled on the rod 16, a link 18 pivotally connecting one arm of the bell crank, and a pad 19 resting against the under face of the saddle 15. To the upper end of the vertical arm of the bell crank 17, is connected one end of a rope or other flexible device, which is passed over a series of pulleys 20, and brought back to position, where it may be grasped by the rider as a rein. By pulling on the rope or rein, the pad 19 will be raised and most of the weight lifted from the body of the mechanical horse and supported by the rod 16. As the weight is lifted from the body of the mechanical horse, the springs 10 will act to raise the same, and so render the gait mechanism inoperative.

In order to render the stirrups readily adjustable to various desired lengths, a series of hooks 21 have been successively arranged on the pommel of the saddle, and are adapted to receive and support the stirrup rope 22, which passes across the pommel and over the pulleys 23.

The shafts 5 are each provided with drive pulleys 24, adapted to be driven in opposite directions by the crossed drive belt 25, one of the shafts being driven by belt and pulley connections from the supporting wheel of the frame 1. A belt shifter mechanism may be used, together with a loose pulley, if desired, in order that the shafts 5 may be rendered temporarily stationary, so that the eccentrics may be adjusted relatively to one another.

It is clear that changes may be made in the construction, arrangement and disposition of the several parts of the invention, and it is meant to include all such within this application, wherein only a preferred form has been disclosed.

Having thus fully described my invention, what I claim as new, and desire to secure by Letters Patent, is:—

1. An apparatus of the character described, comprising a framework, a rod movably suspended from said framework, sectional posts extending through said rod, shafts mounted in said framework and provided with eccentrics adapted to engage and operate the sections of said posts, and a mechanical horse supported by said posts.

2. An apparatus of the character described, comprising a framework, longitudinal bars mounted in said framework, yokes movably supported on said bars, a mechanical horse mounted on said yokes, and means for moving said yokes.

3. An apparatus of the character described, comprising a framework, longitudinal bars mounted therein, spring supported yokes movably mounted on said bars, a mechanical horse mounted on said yokes, and means for moving said yokes.

4. An apparatus of the character described, comprising a framework, longitudinal bars mounted therein, movably mounted yokes supported by said bars, a mechanical horse mounted on said yokes, a rod swingingly suspended from the aforesaid framework, sectional posts extending through said rod and adapted to engage the aforesaid yokes, shafts mounted in said framework and provided with eccentrics adapted to engage the aforesaid sectional posts to operate the same, and means for driving said shafts.

5. An apparatus of the character described, comprising a framework, longitudinal bars mounted in said framework, a mechanical horse movably supported from said bars, a rod journaled in said bars, a saddle movably mounted on the aforesaid mechanical horse, a bell crank connected to the aforesaid rod, a link connected to one end of said bell crank, a pad connected to the free end of said link and adapted to engage the under surface of said saddle, and means for operating said bell crank to move said pad upward against said saddle and so raise the weight from the mechanical horse.

In witness whereof I have hereunto set my hand in the presence of two witnesses.

ANDREW ARCHIBALD WELSH.

Witnesses:
 ROBT. W. ROUGH,
 O. ROUND.